United States Patent [19]

Hatori et al.

[11] Patent Number: 4,807,028
[45] Date of Patent: Feb. 21, 1989

[54] DECODING DEVICE CAPABLE OF PRODUCING A DECODED VIDEO SIGNAL WITH A REDUCED DELAY

[75] Inventors: Yoshinori Hatori, Kanagawa; Mitsuo Nishiwaki, Tokyo; Naoki Mukawa, Kanagawa, all of Japan

[73] Assignees: Kokusai Denshin Denwa Co., Ltd.; Nippon Telegraph & Telephone Corp.; Nec Corp., all of Tokyo, Japan

[21] Appl. No.: 118,922

[22] Filed: Nov. 10, 1987

[30] Foreign Application Priority Data

Nov. 10, 1986 [JP] Japan .................................. 61-265581

[51] Int. Cl.$^4$ .......................................... H04N 7/137
[52] U.S. Cl. .................................... 358/133; 358/146; 370/110.1
[58] Field of Search .................. 358/133, 135, 136, 13, 358/140, 146; 370/110.1

[56] References Cited

U.S. PATENT DOCUMENTS

| | | | |
|---|---|---|---|
| 4,075,655 | 2/1978 | Iijima | 358/13 |
| 4,215,369 | 7/1980 | Iijima | 358/146 |
| 4,472,803 | 9/1984 | Iijima | 358/146 |
| 4,704,629 | 11/1987 | Vreeswijk | 358/146 |
| 4,729,022 | 3/1988 | Shibuya | 358/146 |

Primary Examiner—Howard W. Britton
Attorney, Agent, or Firm—Sughrue, Mion, Zinn, Macpeak & Seas

[57] ABSTRACT

For decoding by the use of a decoder buffer memory an encoded video signal into which an encoder input signal is encoded with data compression on a basis of frames, a decoding device comprises a control signal producing unit for delivering a decoder control signal to a decoder when the frame of data written into the buffer memory coincides with the frame of data read out of the buffer memory. Responsive to the control signal, the decoder produces a supply control signal to the buffer memory to stop delivery of the read-out data to the decoder. Preferably, the decoding device should comprise a processing unit for producing frame pulses at heads of the respective frames of the encoded video signal. A counter counts the frame head pulses to make the write-in data and the read-out data indicate frame numbers for use in the signal producing unit. Alternatively, the decoding device may receive an encoded video signal in which frame number data are included for use in the signal producing unit.

5 Claims, 5 Drawing Sheets

DECODING DEVICE CAPABLE OF PRODUCING A DECODED VIDEO SIGNAL WITH A REDUCED DELAY

BACKGROUND OF THE INVENTION

This invention relates to a decoding device for use in decoding an encoded video signal, into which a video signal representative of successive pictures is compression encoded by a counterpart encoder. Such a decoding device is particularly useful in a television conference system.

In a compression encoding device of a television conference system, the video signal is a television signal. In this event, the successive pictures are represented by successive frames of the television signal.

The compression encoding device is, for example, a predictive encoding device and is effective to achieve data compression as is known in the art. The compression encoding device has an encoded data generating speed which is not constant but varies with time depending upon the characteristic of the video signal. The compression encoding device therefore comprises an encoder buffer memory in order to carry out speed conversion between the encoded data generating speed and an encoded data transmitting speed. The encoded data generating speed and the encoded data transmitting speed are equal to write-in speed and read-out speed, respectively, of the encoder buffer memory. The encoded data are transmitted from the compression encoding device to the decoding device through a transmission line. The decoding device for decoding the encoded data comprises a decoder buffer memory in order to carry out speed conversion between the encoded data transmitting speed and a data decoding speed, at which the encoded data are decoded in a decoder. The encoded data transmitting speed and the data decoding speed are equal to the write-in speed and the read-out speed, respectively, of the decoder buffer memory.

It is necessary to carry out the speed conversion by the encoder and the decoder buffer memories without partially losing or duplicating the data. In order to correctly decode the encoded data by the decoder, it is necessary to control the read-out speed of the decoder buffer memory. Each of the encoder and the decoder buffer memories has a delay time caused by difference between the write-in speed and the read-out speeds. The delay time of the encoder buffer memory is utilized for controlling the read-out speed of the decoder buffer memory. To describe more exactly, the delay time of the encoder buffer memory is detected at the compression encoding device. Information of the delay time is transmitted to the decoding device as delay time information through the transmission line. In the decoding device, read-out of the decoder buffer memory is controlled by using the delay time information so that a sum of the delay time in the encoder and the decoder buffer memories becomes constant.

The compression encoding device and the decoding device of the type described above are exemplified in U.S. Pat. No. 4,472,803 issued Sept. 18, 1984, to Yukihiko Iijima and assigned to NEC Corporation.

The delay time of the above-described decoding device is influenced by a maximum delay time in the compression encoding device because the read-out of the decoder buffer memory is controlled by the use of the delay time information. In other words, the delay time is determined for the decoder buffer memory by the maximum delay time of the encoder buffer memory.

In addition, the delay time of the encoder buffer memory increases in proportion to the amount of the encoded data per frame. On the other hand, the compression encoding device generates a large amount of encoded data on a scene change between the pictures. Therefore, the encoder buffer memory has a long delay time on the scene change. This means that the decoder buffer memory has also a long delay time even if the encoded video signal comprises the frames each of which has only a small amount of encoded data. Responsive to the read-out data of the decoder buffer memory, the decoding device decodes the encoded video signal into a decoded video signal.

The decoded video signal is used in reproducing images corresponding to the pictures represented by the video signal supplied to the compression encoding device. Regardless of the amount of encoded data, the images has a bad influence caused by the delay time of the decoder buffer memory.

SUMMARY OF THE INVENTION

It is therefore an object of this invention to provide a decoding device capable of producing a decoded video signal with a reduced delay.

A decoding device to which this invention is applicable is for use as a counterpart of an encoding device for compression encoding an encoder input video signal comprising successive frames into an encoded video signal. The decoding device is for decoding the encoded video signal into a decoded video signal. The decoding device comprises a decoder buffer memory for carrying out speed conversion between write-in data given by the encoded video signal and read-out data read out of the decoder buffer memory and a decoder for decoding the read-out data into the decoded video signal.

According to an aspect of this invention, the decoding device further comprises signal producing means responsive to the write-in data and the read-out data for producing a decoder control signal when the write-in data and the read-out data are in one of the frames, first supplying means for supplying the decoder with the read-out data, and second supplying means for supplying the decoder with the decoder control signal. The decoder is responsive to the decoder control signal for producing a supply control signal. The decoding device still further comprises third supplying means for supplying the supply control signal to stop supply of the read-out data to the decoder.

According to another aspect of this invention, there is provided a decoding device which is operable in response to the encoded video signal comprising encoded data of the respective frames and frame head data at heads of the respective frames. More particularly, the decoding device comprises detecting means responsive to the encoded video signal for detecting the frame head data to produce frame head pulses, number giving means responsive to the frame pulses for giving frame numbers to the respective frames to produce a first frame number signal representative of the frame numbers, multiplexing means coupled to the number giving means for multiplexing the encoded video signal and the first frame number signal into a multiplexed signal, means for supplying the multiplexed signal to the decoder buffer memory as the write-in data, first signal producing means responsive to the read-out data for producing a second frame number signal representative of the frame numbers indicated by the first frame number signal multiplexed in the read-out data, second signal producing means responsive to the first and the second frame number signals for producing a decoder control signal when the frame number represented by the first frame number signal coincides with the frame number represented by the second frame number signal, first supplying means for supplying the decoder with the encoded data included in the read-out data, and second supplying means for supplying the decoder with the decoder control signal. The decoder is responsive to the decoder control signal for producing a supply control signal. The decoding device still further comprises third supplying means for supplying the supply control signal to stop supply of the encoded data to said decoder.

DESCRIPTION OF THE PREFERRED EMBODIMENTS

Figure 1:
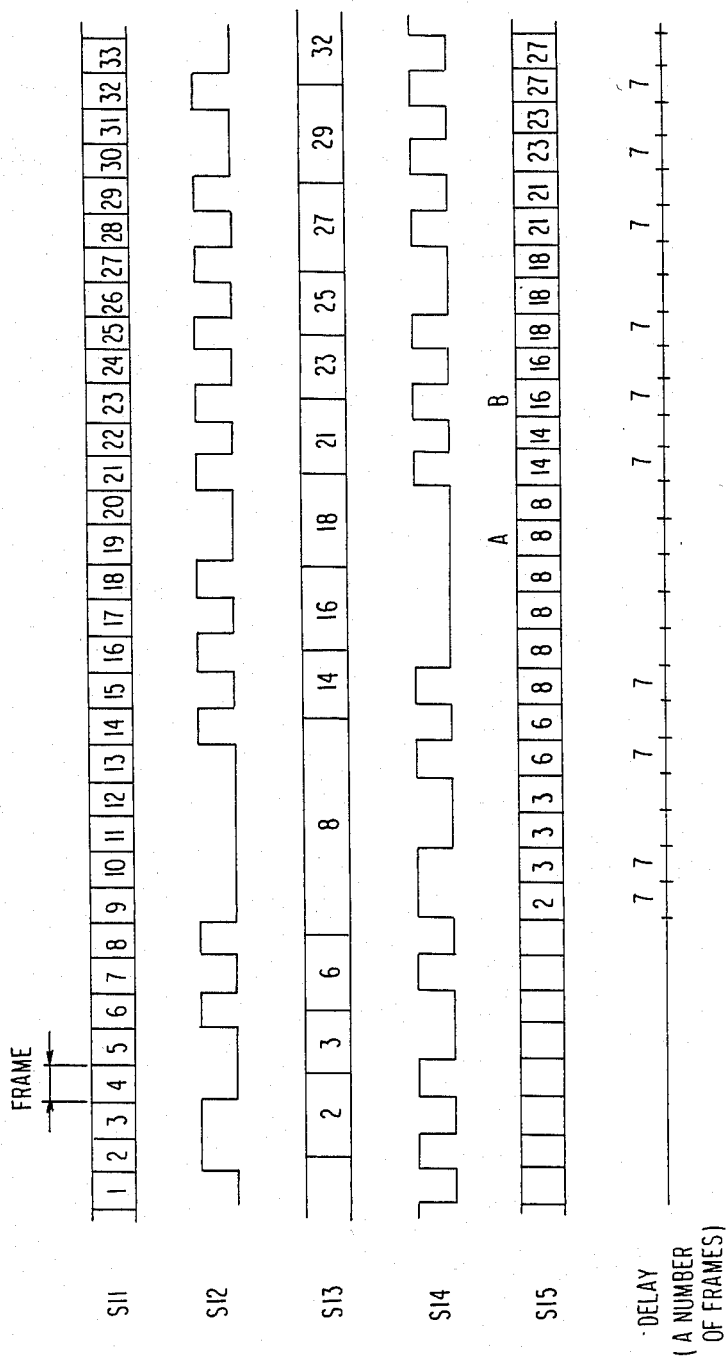
FIG. 1 shows a time chart for use in describing operation of a conventional video signal transmitting system.

Referring to FIG. 1, a conventional video signal transmitting system will be described at first in order to facilitate a clear understanding of the present invention. The video signal transmitting system is of the type disclosed in the U.S. Pat. No. 4,472,803 referred to hereinabove and is for use in compression encoding a video signal into an encoded video signal for transmission to a transmission line (not shown) and in decoding the encoded video signal into a decoded video signal.

Although not depicted in FIG. 1, a predictive encoding device and a predictive decoding device are included in the video signal transmitting system. Ordinarily, the predictive encoding device comprises an encoder and an encoder buffer memory. The predictive decoding device comprises a decoder and a decoder buffer memory. The frame thinning operation is necessary particularly when the encoded video signal must be sent to the transmission line at a low bit rate. The encoder carries out frame thinning or subsampling operation as will presently be described.

An input video signal S11 is shown along a top line of FIG. 1 and comprises encoded data of successive frames which are numbered from 1 to 33 and will be called first through thirty-third frames for convenience of the description. In encoding operation of the predictive encoding device, the encoder thins out the frames into thinned or subsampled frames in response to a frame selection signal S12 shown along a second line of FIG. 1. Generation of the frame selection signal S12 depends upon an amount of encoded data per frame. For example, the frame selection signal S12 is generated in the manner known in the art immediately when a large amount of data of the input video signal are encoded by the encoder in the encoded data. The frame selection signal S12 lasts during at least one frame. The decoder sends he encoded data to the decoder buffer memory on presence of the frame selection signal S12.

It is to be noted here that the transmission line can not necessarily transmit the encoded data of a single frame within a single frame period. Instead, the encoded data of a single frame must be transmitted through the transmission line throughout a plurality of frame periods. It will be assumed that the encoded data of the eighth frame 8 must be transmitted in six frame periods. In this event, it becomes necessary to suspend transmission of the ninth through the thirteenth frames 9 to 13. Depending on the amount of data of the input video signal, each of the thinned frames may have a length of at least one frame period and a fraction of the frame period.

The encoded data are temporarily stored in the encoder buffer memory to carry out speed conversion between an encoded data generating speed and an encoded data transmitting speed. For example, the encoded data of the eighth frame are stored during six frame periods. From the encoder buffer memory, read-out data are read out as the encoded video signal. In the manner depicted along a third line of FIG. 1 at S13, the thinned frames are contiguous in the encoded video signal S13. By way of example, the thinned frames are the second, the third, the sixth, the eighth, the fourteenth, and other frames 2, 3, 6, 8, 14 and so on. The encoded video signal S13 is transmitted through the transmission line to the predictive decoding device at a constant low bit rate.

The predictive decoding device receives the encoded video signal as a reception encoded video signal. The reception encoded video signal has a frame structure which is identical with that of the encoded video signal S13. It should be understood that the third line shows in fact the reception encoded video signal at S13. The reception encoded video signal S13 is stored in the decoder buffer memory. Read-out of the decoder buffer memory is controlled by using a read-out designation signal S14 shown along a fourth line of FIG. 1 so that a sum of the delay times mentioned hereinabove in connection with the encoder and the decoder buffer memories becomes constant. The read-out designation signal S14 is generated by using the frame selection signal S12. The read-out designation signal S14 has a signal pattern which corresponds to that of the frame selection signal S12 and which is delayed by a constant delay time relative to the frame selection signal S12. Only in the presence of the read-out designation signal S14, the decoder buffer memory produces the read-out data. The decoder of the predictive decoding device decodes the read-out data of the decoder buffer memory into a decoded video signal S15 shown along a fifth line of FIG. 1. In addition, the decoder holds the next previous frame of the decoded video signal S15 on the absence of the read-out data. The same frame, namely, the next previous frame, of the decoded video signal S15 is repeatedly held while the read-out designation signal S14 lasts. Thus, the next previous frame is used in the decoder in compensating for the frame deleted by the encoder.

Numerals shown along a bottom line of FIG. 1 represent delays which are introduced into the respective frames in the number of frames by the encoder and the decoder buffer memories. The decoded video signal S15 has always the delay of seven frames relative to the input video signal S11 because the frame of the encoded data is allowed to thin up to five frames as described before. Although the sixteenth frame of the decoded video signal S15 can be decoded at a point A depicted along the fifth line of FIG. 1, the decoding operation of the decoder is delayed until at a point B depicted along the fifth line of FIG. 1.

Figure 2:
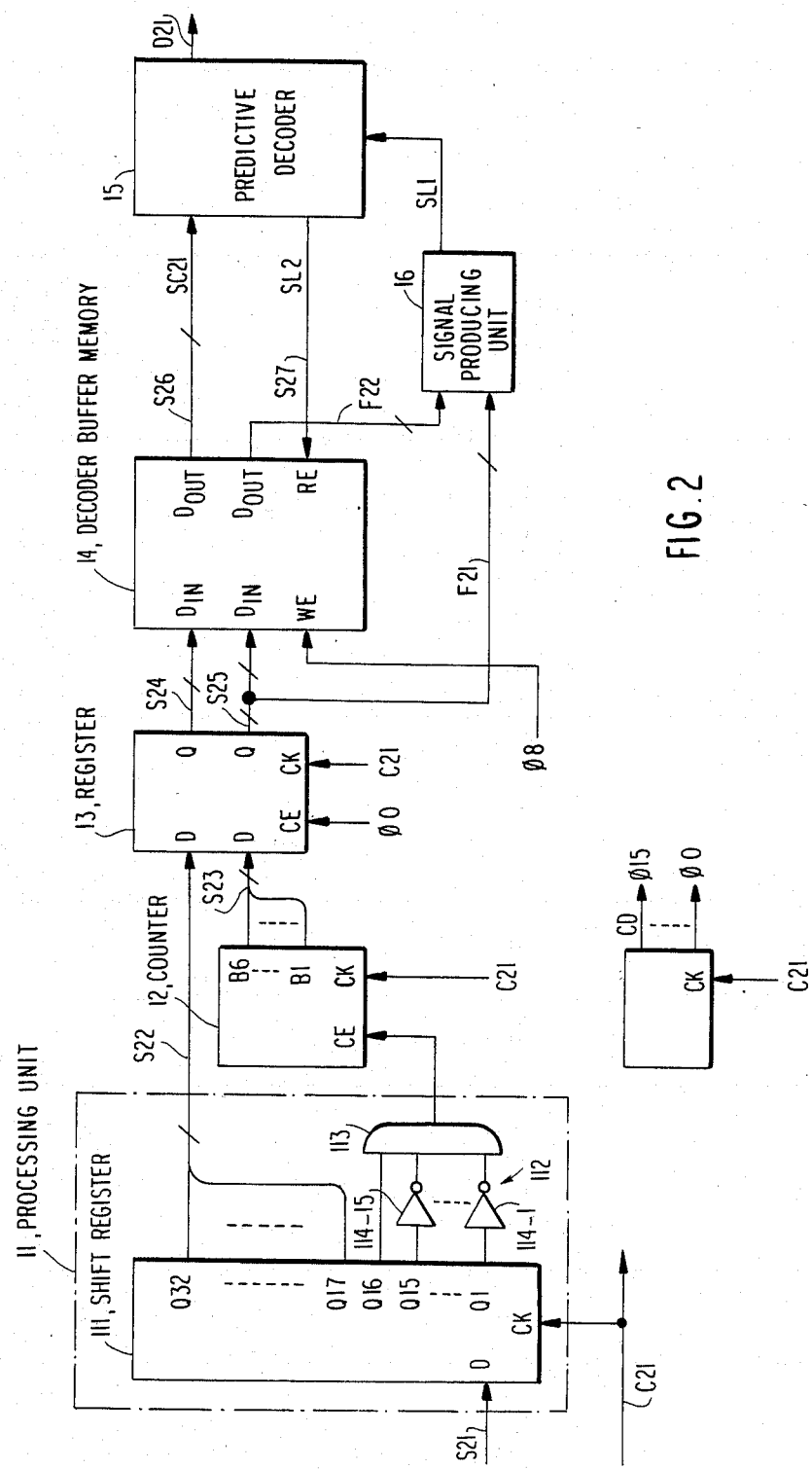
FIG. 2 is a block diagram of a decoding device according to a first embodiment of this invention.

Referring now to FIG. 2, attention will be directed to a predictive decoding device according to a first embodiment of this invention. The predictive decoding device is for use as a counterpart of the conventional predictive encoding device described with reference to FIG. 1 in decoding an encoded video signal S21 produced by the predictive encoding device in bit series. Responsive to the encoded video signal S21, the predictive decoding device produce a decoded video signal D21.

Figure 3:
FIG. 3 shows a time chart for use in describing operation of the decoding device illustrated in FIG. 2.

Referring to FIG. 3, brief description will be again made as regards the conventional predictive encoding device before description of the embodiment. An input video signal S11' is shown along a top line and is encoded by the conventional predictive encoding device by the use of a frame selection signal S12' shown along a second line in the manner described in conjunction with FIG. 1. The conventional predictive encoding device transmits transmission data comprising encoded data at a constant bit rate through a transmission line to the predictive decoding device illustrated in FIG. 2. The predictive decoding device receives the transmission data as the encoded video signal S21 shown along a third line of FIG. 3. In the example being illustrated, the input video signal S11' and the frame selection signal S12' are identical with the input video signal S11 and the frame selection signal S12, respectively. In this connection, the decoded video signal S21 is identical with the encoded video signal S13 illustrated in FIG. 1.

Figure 4:
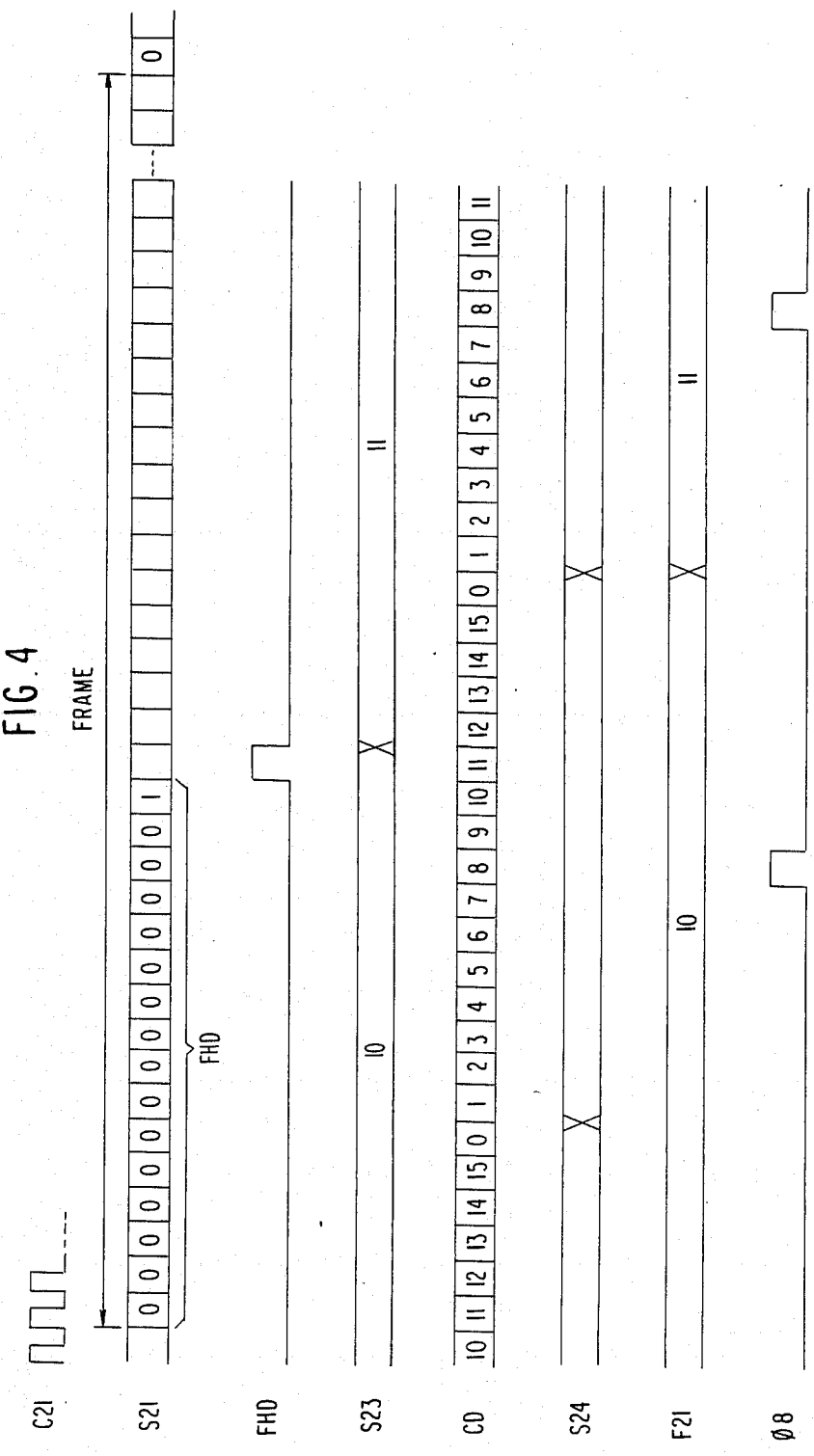
FIG. 4 shows a more detailed time chart for use in describing operation of the decoding device depicted in FIG. 2.

Referring back to FIG. 2 and afresh to FIG. 4, the predictive decoding device comprises a processing unit 11, a counter 12, a register 13, a decoder buffer memory 14, a predictive decoder 15, and a signal producing unit 16. It may be mentioned here that the predictive decoding device receives the video signal S21 at a bit rate or with a bit cycle of the transmission line. The encoded video signal S21 is supplied to the processing unit 11 in bit series in synchronism with a clock C21 which is shown along a top line of FIG. 4 and has the bit rate of the transmission line. The encoded video signal S21 is shown along a second line of FIG. 4 and comprises encoded data of the respective frames and frame head data at heads of the respective frames. The encoded data comprises successive variable-length data or successive constant-length data. Each of the variable-length data and the constant-length data has a data length which is not longer than sixteen bits. The frame head datum FHD consists of sixteen bits which has a bit pattern of fifteen 0's and a single 1 following the 0's. The frame head datum may be said to represent a unique code.

The processing unit 11 comprises a shift register 111 and a logic circuit 112. The shift register 111 is of a 32-bit type having first through sixteenth bit terminals Q1 to Q16 and seventeenth through thirty-second bit terminals Q17 to Q32 and is for separating the bit serial encoded data of the encoded video signal S21 into the frame head data and the encoded data. The shift register 111 produces the frame head data through the first through the sixteenth bit terminals Q1 to Q16 in bit parallel and the encoded data through the seventeenth through the thirty-second bit terminals Q17 to Q32 in bit parallel as a processed video signal S22. The logic circuit 112 is for detecting the frame head data and comprises an AND gate 113 which has first through sixteenth input terminals. The first through the fifteenth input terminals of the AND gate 113 are connected to the first through the fifteenth bit terminals Q1 to Q15 of the shift register 111 via first through fifteenth inverters 114-1 to 114-15, respectively. The sixteenth input terminal of the AND gate 113 is directly connected to the sixteenth bit terminal of the shift register 111. The AND gate 113 delivers a frame head pulse FHP to the counter 12 on detection of the frame head data. The frame head pulse FHP is shown along a third line of FIG. 4 and has a pulse width which is equal to single bit cycle of the clock C21.

The counter 12 is supplied with the frame head pulse FHP and the clock C21. The counter 12 is a mod-$2^6$ counter and is for counting pulses of the clock C21. The frame head pulse FHP is delivered to a count enable terminal CE of the counter 12 and makes the counter 12 count the pulses of the clock C21. The frame head pulse FHP is therefore called a count enable signal. The counter 12 produces count data as an original frame number signal S23 each time when the frame head pulses FHP appears. The original frame number signal S23 consists of first through sixth bit signals B1 to B6 which can represent 0 through 63. The original frame number signal S23 is shown along a fourth line of FIG. 4 and represents the respective frame numbers of the encoded video signal S21 in numerical order. Therefore, the counter 12 may be called a number giving unit. It is to be noted that the maximum frame number represented by the original frame number signal is not smaller than the number of frames which can be stored in the decoder buffer memory 14. For example, the frame numbers 10 and 11 are illustrated in FIG. 4. The count data of the counter 12 are held until the counter 12 is supplied with the next frame head pulse FHP.

The predictive decoding device further comprises an additional counter 17 which is a mod-$2^4$ counter The additional counter 17 counts the pulses of the clock C21 and produces count data CD comprising zeroth through fifteenth bit signals $\phi_0$ to $\phi_{15}$ in bit parallel. The count data CD cyclically increase from zero to fifteen as shown along a fifth line of FIG. 4.

The processed video signal S22 and the original frame number signal S23 are supplied to the register 13. The register 13 is for writing the processed video signal S22 and the original frame number signal S23 in the decoder buffer memory 14 by aligning the processed video signal S22 and the original frame number signal S23 in the following manner. The register 13 is also supplied with the clock C21 and the zeroth bit signal $\phi_0$ of the additional counter 17. The register 13 stores the processed video signal S22 as first store data and the original frame number signal S23 as second store data in synchronism with the clock C21. In the register 13, the first and the second store data are simultaneously cleared on reception of the zeroth bit signal $\phi_0$. At this instant of time, the register 13 produces the first store data as a buffer input signal S24 and the second store data as a second buffer input signal S25. The first buffer input signal S24 is represented by sixteen parallel bits and is supplied to the decoder buffer memory 14 as a first part of write-in data. The first buffer input signal S24 is shown along a sixth line of FIG. 4 and is held by the zeroth bit signal $\phi_0$ during sixteen bit cycles of the clock C21. The second buffer input signal S25 is represented by six parallel bits and is divided into two parts, one of which is supplied to the decoder buffer memory 14 as a second part of the write-in data. The other part is supplied to the signal producing unit 16 as a first frame number signal F21 to carry out a comparing operation as will be described later. The first frame number signal F21 is shown along a fourth line of FIG. 3 and also shown along a seventh line of FIG. 4. The first frame number signal F21 is held during a single frame period.

The decoder buffer memory 14 temporarily stores the first buffer input signal S24 as main data and the second buffer input signal S25 as subdata each time when a write enable terminal WE receives the eighth bit signal $\phi_8$ of the additional counter 17. The eighth bit signal $\phi_8$ is shown along a bottom line of FIG. 4 and may be called a write enable signal. The decoder buffer memory 14 is for carrying out speed conversion between a write-in speed and a read-out speed, namely, a decoding speed of the predictive decoder 15. Needless to say, the read-out speed is faster than the write-in speed. An FIFO (first-in first-out) memory is useful as the decoder buffer memory 14. The decoder buffer memory 14 produces the main data as a read-out signal S26 represented by sixteen parallel bits and the subdata as a second frame number signal F22 represented by six parallel bits in response to a supply control signal S27 produced by the predictive decoder 15. The second frame number signal F22 is shown along a fifth line of FIG. 3. The supply control signal S27 is shown along a sixth line of FIG. 3 and is generated in the manner which will be described later.

The read-out signal S26 is supplied to the predictive decoder 15 as read-out data of the decoder buffer memory 14 through a supplying circuit SC21 which has sixteen lines. Namely, the supplying circuit SC21 is operable as a first supplying circuit. The second frame number signal F22 is supplied to the signal producing unit 16. The signal producing unit 16 may be a comparator in the example being illustrated and is for comparing the frame number represented by the first frame number signal F21 and the frame number represented by the second frame number signal F22. Needless to say, the first frame number signal F21 represents the frame number of the write-in data of the decoder buffer memory 14 while the second frame number signal F22 represents the frame number of the read-out signal S26 of the decoder buffer memory 14. When the frame number of the write-in data coincides with the frame number of the read-out signal S26, it is necessary to suppress production of the read-out signal S26 in order to prevent underflow of the decoder buffer memory 14.

The signal producing unit 16 produces a decoder control signal only when the frame number of the write-in data coincides with the frame number of the read-out signal S26. The decoder control signal is supplied through a first control signal line SL1 to the predictive decoder 15. The first control signal line SL1 is operable as a second supplying circuit. The predictive decoder 15 detects presence or absence of the decoder control signal at the beginning of each frame of the read-out signal S26. The predictive decoder 15 stops production of read-out signal S26 during the next following frame on detection of the decoder control signal. On detection of the decoder control signal, the predictive decoder 15 produces the supply control signal S27 of a binary "0" value. The supply control signal S27 is delivered back to the decoder buffer memory 14 through a second control signal line SL2. The second control signal line SL2 is operable as a third supplying circuit. The supply control signal S27 is for controlling production of the read-out signal S26 and has a binary "1" value when the signal producing unit 16 does not produce the decoder control signal. Namely, the read-out signal S26 is delivered to the predictive decoder 15 only when the supply control signal S27 has the binary value "1." The supply control signal S27 of the logic "1" value may be called a read enable signal.

Responsive to the read-out signal S26, the predictive decoder 15 decodes the read-out signal S26, namely, the encoded data, into the decoded video signal D21 in the manner known in the art. In the absence of the read-out signal S26, the predictive decoder 15 holds the next previous frame of the decoded video signal D21 by using a frame memory which comprises in the manner known in the art. The decoded video signal D21 is shown along a seventh line of FIG. 3. Numerals shown along a bottom line of FIG. 3 represent delays in the respective frames of the decoded video signal D21 at the number of the frames. The respective frames of the decoded video signal D21 shown in FIG. 3 has variable delays which are not longer than the constant delay described in conjunction with FIG. 1.

Figure 5:
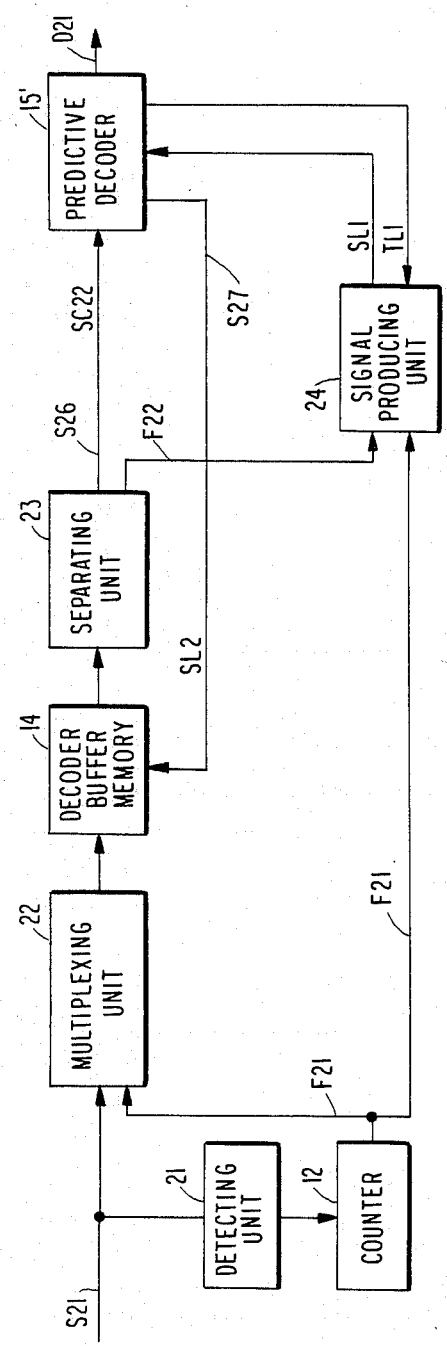
FIG. 5 is a block diagram of a decoding device according to a second embodiment of this invention.

Referring to FIG. 5, the description will proceed to a predictive decoding device according to a second embodiment of this invention. The predictive decoding device deals with signals, some of which are similar to those described in connection with FIG. 2. Other of the signals are different. More specifically, the predictive decoding device is for use in processing the encoded video signal S21 in bit series. At any rate, the predictive decoding device carries out decoding operation which is similar to that described in conjunction with FIG. 2. Therefore, description will be made briefly.

Besides similar parts designated by like reference numerals, the predictive decoding device comprises a predictive decoder 15', a detecting unit 21, a multiplexing unit 22, a separating unit 23, and a signal producing unit 24. The predictive decoder 15' is similar to that illustrated in FIG. 2 except that the predictive decoder 15' produces a frame signal in the manner which will be described later. As described in conjunction with FIG. 4, the encoded video signal S21 comprises the encoded data of the respective frames and the frame head data at heads of the respective frames. The encoded video signal S21 is divided into two parts, one of which is supplied to the detecting unit 21. The other part is supplied to the multiplexing unit 22. The detecting unit 21 is for detecting the frame head data included in the encoded video signal S21. The detecting unit 21 may comprise the logic circuit 112 described in conjunction with FIG. 2. The detecting unit 21 produces the frame head pulses on detection of the frame head data. The frame head pulses are supplied to the counter 12. The counter 12, namely, the number giving unit, produces the first frame number signal F21 each time when the frame head pulse appears. The first frame number signal F21 is supplied to the multiplexing unit 22 and the signal producing unit 24.

Responsive to the encoded video signal S21 and the first frame number signal F21, the multiplexing unit 22 multiplexes the encoded video signal S21 and the first frame number signal F21 into a multiplexed signal. More specifically, the multiplexing unit 22 inserts the first frame number signal F21 between the frame head data and the encoded data of the encoded video signal S21. The multiplexed signal is supplied to the decoder buffer memory 14 as write-in data. The decoder buffer memory 14 temporarily stores the multiplexed signal. As described with reference to FIG. 2, the decoder buffer memory 14 produces read-out data in response to the supply control signal S27 produced by the predictive decoder 15'. The read-out data are supplied to the separating unit 24. Responsive to the read-out data, the separating unit 23 separates the read-out data into a separated first frame number signal and separated encoded data. The separating unit 23 produces the separated first frame number signal as the second frame number signal F22 and the separated encoded data as the read-out signal S26. The separating unit 23 is operable as a first signal producing circuit. The second frame number signal F22 represents the frame numbers indicated by the first frame number signal F21 and is supplied to the signal producing unit 24. The read-out signal S26 is supplied through a supplying circuit SC22 to the predictive decoder 15'. The supplying circuit SC22 is operable as a first supplying circuit.

Responsive to the read-out signal S26, the predictive decoder 15' produces the frame signal at each head of the frames. The signal producing unit 24 compares the frame number represented by the first frame number signal F21 with the frame number represented by the second frame number signal F22 in response to the frame signal. The frame signal is used in timing the first and the second frame number signals F21 and F22. The signal producing unit 24 produces the decoder control signal only when the frame number represented by the first frame number signal F21 coincides with the frame number represented by the second frame number signal F22. The decoder control signal is supplied through the first control signal line SL1 to the predictive decoder 15'. The first control signal line SL1 is operable as a second supplying circuit.

The predictive decoder 15' produces the frame signal at the beginning of each frame of the read-out signal S26. The frame signal is supplied through a timing signal line TL1 to the signal producing unit 24. Besides, the predictive decoder 15' produces the supply control signal S27 with the binary "0" value in the presence of the decoder control signal to stop production of the read-out data of the next following frame. On the other hand, the predictive decoder 15' produces the supply control signal S27 with the binary "1" value on the absence of the decoder control signal to read out the read-out data. The supply control signal S27 is delivered through the second control signal line SL2 back to the decoder buffer memory 14. The second control signal line SL2 is operable as a third supplying circuit. Thus, the decoder buffer memory 14 produces the read-out data when the supply control signal S27 has the binary "1" value and stops the production of the read-out data of the next following frame when the supply control signal S27 has the binary "0" value.

Responsive to the read-out signal S26, the predictive decoder 15' decodes the read-out signal S26 into the decoded video signal D21. In the absence of the read-out signal S26, the predictive decoder 15' holds the next previous frame of the decoded video signal D21.

Figure 6:
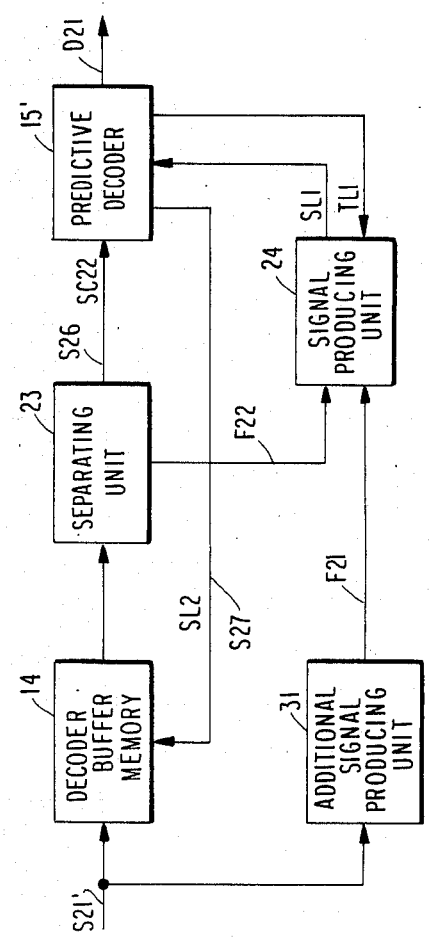
FIG. 6 is a block diagram of a decoding device according to a third embodiment of this invention.

Referring to FIG. 6, the description will further proceed to a predictive decoding device according to a third embodiment of this invention. The predictive decoding device is for use as a counterpart of a predictive encoding device comprising the detecting unit, the counter, and the multiplexing unit described with reference to FIG. 5. In this event, the predictive encoding device transmits a multiplexed signal into which frame number data and encoded data are multiplexed.

The predictive decoding device deals with signals, most of which are similar to those described in conjunction with FIG. 5. The predictive decoding device carries out decoding operation which is similar to that described with reference to FIG. 5.

Besides similar parts designated by like reference numerals, the predictive decoding device comprises an additional signal producing unit 31. The predictive decoding device receives the multiplexed signal as an encoded video signal depicted in FIG. 6 at S21'. The encoded video signal S21' comprises encoded data of a sequence of frames given successive frame numbers and frame number data indicative of the respective frame numbers. The encoded video signal S21' is supplied to the decoder buffer memory 14 as write-in data and is supplied to the additional signal producing unit 31. Responsive to the encoded video signal S21', the additional signal producing unit 31 produces the first frame number signal F21 by detecting the frame number data multiplexed in the encoded video signal S21'. The first frame number signal F21 represents the frame numbers indicated by the respective frame number data of the encoded video signal S21', namely, the write-in data. The additional signal producing unit 31 is operable as a first signal producing circuit. The first frame number signal F21 is supplied to the signal producing unit 24.

Responsive to the encoded video signal S21', the decoder buffer memory 14 stores the encoded video signal S21'. The decoder buffer memory 14 produces read-out data in response to the supply control signal S27 in the manner described in conjunction with FIG. 5. The read-out data are supplied to the separating unit 23. Responsive to the read-out data, the separating unit 23 separates the read-out data into the frame number data and the encoded data. The separating unit 23 delivers separated frame number data as the second frame number signal F22 to the signal producing unit 24 and delivers separated encoded data as the read-out signal S26 through the supplying circuit SC22 to the predictive decoder 15'. The separating unit 23 is operable as a second signal producing circuit. The supplying circuit SC22 is operable as a first supplying circuit. The second frame number signal F22 represents the frame numbers indicated by the frame number data included in the read-out data.

As described with reference to FIG. 5, the predictive decoder 15' produces the frame signal at the beginning of each frame of the read-out signal S26. The frame signal is supplied through the timing signal line TL1 to the signal producing unit 24. On reception of the frame signal, the signal producing unit 24 compares the frame number represented by the first frame number signal F21 with the frame number represented by the second frame number signal F22. The signal producing unit 24 produces the decoder control signal in the manner described in conjunction with FIG. 5. The signal producing unit 24 is operable as a third signal producing circuit. The decoder control signal is supplied through the first control signal line SL1 to the predictive decoder 15'. The first control signal line SL1 is operable as a second supplying circuit.

The predictive decoder 15' produces the supply control signal S27 with the binary "0" value in the presence of the decoder control signal and produces the supply control signal with the binary "1" value in the absence of the decoder control signal. The supply control signal S27 is delivered through the second control signal line SL2 back to the decoder buffer memory 14. The second control signal line SL2 is operable as a third supplying circuit. The decoder buffer memory 14 produces the read-out data when the supply control signal S27 has the binary "1" value and stops the production of the read-out data of the next following frame when the supply control signal S27 has the binary "0" value.

Responsive to the read-out signal S26, the predictive decoder 15' decodes the read-out signal S26, namely, the encoded data, into the decoded video signal D21. In the absence of the second separated signal, the predictive decoder holds the next previous frame of the decoded video signal D21.

While this invention has thus far been described in conjunction with a few preferred embodiments thereof, it will readily be possible for those skilled in the art to put this invention into practice in various other manners. For example, the predictive decoding device may be either an in-frame decoding device and an interframe decoding device. Incidentally, it will be understood that compression encoding is carried out on the input video signal on a frame basis. More particularly, the compression encoding is achieved by frame thinning or subsampling and additionally by in-frame and interframe encoding.

What is claimed is:

1. A decoding device for use as a counterpart of an encoding device for compression encoding an encoder input video signal comprising successive frames into an encoded video signal, said decoding device being for decoding said encoded video signal into a decoded video signal and comprising a decoder buffer memory for carrying out speed conversion between write-in data given by said encoded video signal and read-out data read out of said decoder buffer memory and a decoder for decoding said read-out data into said decoded video signal, wherein the improvement comprises:
   signal producing means responsive to said write-in data and said read-out data for producing a decoder control signal when said write-in data and said read-out data are in one of said frames;
   first supplying means for supplying said decoder with said read-out data; and
   second supplying means for supplying said decoder with said decoder control signal;
   said decoder being responsive to the decoder control signal for producing a supply control signal;
   said decoding device further comprising third supplying means for supplying said supply control signal to stop supply of said read-out data to said decoder.

2. A decoding device as claimed in claim 1, said encoded video signal comprising encoded data of the respective frames and frame head data at heads of the respective frames, wherein said decoding device further comprises:
   processing means for processing the encoded data of said encoded video signal into a processed video signal and said frame head data into frame head pulses, respectively;
   number giving means responsive to said frame pulses for giving frame numbers to the respective frames to produce a frame number signal representative of said frame numbers; and
   writing means coupled to said decoder buffer memory for writing said processed video signal and said frame number signal in said decoder buffer memory as said write-in data.

3. A decoding device as claimed in claim 2, wherein said signal producing means comprises comparing means responsive to the frame number signal of said write-in data and the frame number signal of said read-out data for comparing the frame number of said write-in data and the frame number of said read-out data to produce said decoder control signal when the frame number of said write-in data coincides with the frame number of said read-out data.

4. A decoding device for use as a counterpart of an encoding device for compression encoding an encoder input video signal into an encoded video signal, said decoding device being for decoding said encoded video signal into a decoded video signal and comprising a decoder buffer memory for carrying out speed conversion between write-in data given by said encoded video signal and read-out data read out of said decoder buffer memory and a decoder for decoding said read-out data into said decoded video signal, said encoded video signal comprising encoded data of the respective frames and frame head data at heads of the respective frames, wherein said decoding device further comprises:
   detecting means responsive to said encoded video signal for detecting said frame head data to produce frame head pulses;
   number giving means responsive to said frame pulses for giving frame numbers to the respective frames to produce a first frame number signal representative of said frame numbers;
   multiplexing means coupled to said number giving means for multiplexing said encoded video signal and said first frame number signal into a multiplexed signal;
   means for supplying said multiplexed signal to said decoder buffer memory as said write-in data;
   first signal producing means responsive to said read-out data for producing a second frame number signal representative of the frame numbers indicated by the first frame number signal multiplexed in said read-out data;
   second signal producing means responsive to said first and said second frame number signals for producing a decoder control signal when the frame number represented by said first frame number signal coincides with the frame number represented by said second frame number signal;
   first supplying means for supplying said decoder with the encoded data included in said read-out data; and
   second supplying means for supplying said decoder with said decoder control signal;
   said decoder being responsive to the decoder control signal for producing a supply control signal;
   said decoding device further comprising third supplying means for supplying said supply control signal to stop supply of said encoded data to said decoder.

5. A decoding device for use as a counterpart of an encoding device for compression encoding an encoder input video signal into an encoded video signal, said decoding device being for decoding said encoded video signal into a decoded video signal and comprising a decoder buffer memory for carrying out speed conversion between write-in data given by said encoded video signal and read-out data read out of said decoder buffer memory and a decoder for decoding said read-out data into said decoded video signal, said encoded video signal comprising encoded data of a sequence of frames given successive frame numbers and frame number data indicative o the respective frame numbers, wherein the improvement comprises:

first signal producing means responsive to said encoded video signal for producing a first frame number signal representative of the frame numbers indicated by the respective frame number data of said encoded video signal;

second signal producing means responsive to said read-out data for producing a second frame number signal representative of the frame numbers indicated by the respective frame number data included in said read-out data;

third signal producing means responsive to said first and said second frame number signals for producing a decoder control signal when the frame number represented by said first frame number signal coincides with the frame number represented by said second frame number signal;

first supplying means for supplying said decoder with the encoded data included in said read-out data; and second supplying means for supplying said decoder with said decoder control signal;

said decoder being responsive to the decoder control signal for producing a supply control signal;

said decoding device further comprising third supplying means for supplying said supply control signal to stop supply of said encoded data to said decoder.

* * * * *